United States Patent [19]

Bradbury et al.

[11] 3,885,807

[45] May 27, 1975

[54] WHEELED VEHICLE WITH SNAP-IN WHEEL SUPPORTS

[75] Inventors: James W. Bradbury, Butler; William Todeff, Cuyahoga, both of Ohio

[73] Assignee: The Huffman Manufacturing Company, Miamisburg, Ohio

[22] Filed: Jan. 17, 1974

[21] Appl. No.: 434,010

[52] U.S. Cl............................ 280/80 R; 280/150 A
[51] Int. Cl............................................ B60b 37/00
[58] Field of Search.......... 280/80 R, 414 A, 150 A, 280/47.13 R, 47.13 B, 47.26, 79.2; 9/1 T

[56] References Cited
UNITED STATES PATENTS

| | | | |
|---|---|---|---|
| 2,484,346 | 10/1949 | Iorns | 280/414 A |
| 3,333,861 | 8/1967 | Hoffman | 280/47.32 |
| 3,462,171 | 8/1969 | Mitty et al. | 280/47.26 |

*Primary Examiner*—David Schonberg
*Assistant Examiner*—John A. Pekar
*Attorney, Agent, or Firm*—Biebel, French & Bugg

[57] ABSTRACT

A wheeled vehicle, such as a mower, is provided with wheel supports having tongues which extend through slots formed in a depending skirt portion of the vehicle chassis. The wheel supports receive bearings which rotatably receive the vehicle axle. The vehicle wheels, fixed to the axle, prevent the wheel supports from pivoting outwardly and disengaging from the slots in the chassis. This construction replaces conventional bolted assembles and eliminates the use of separate fasteners.

9 Claims, 5 Drawing Figures

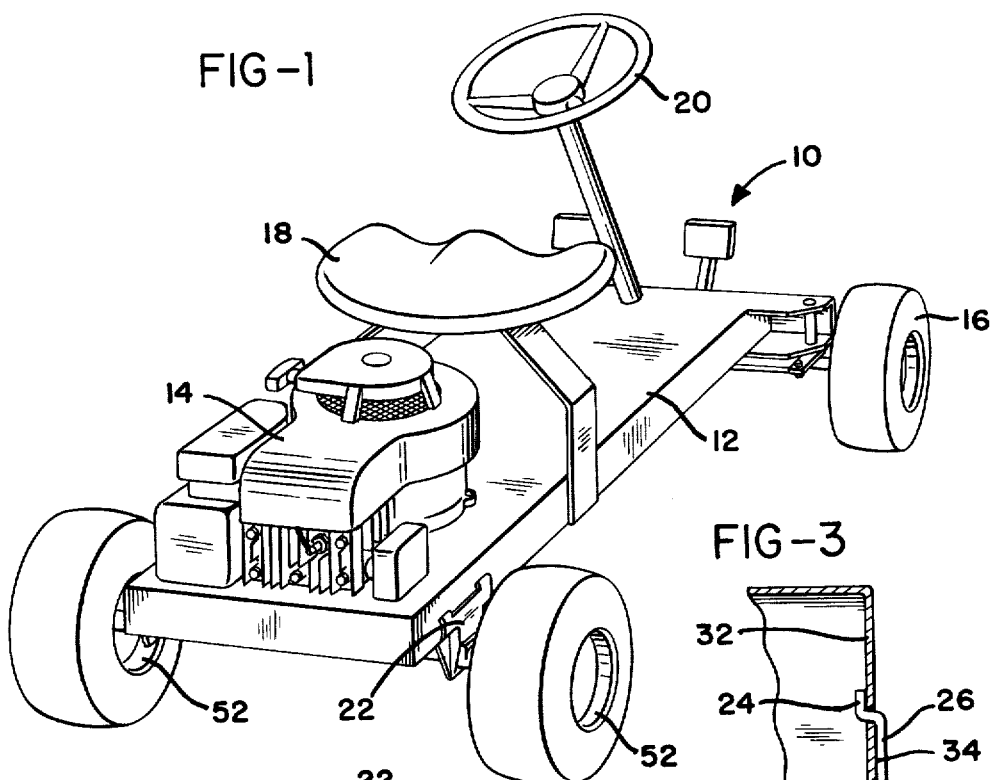
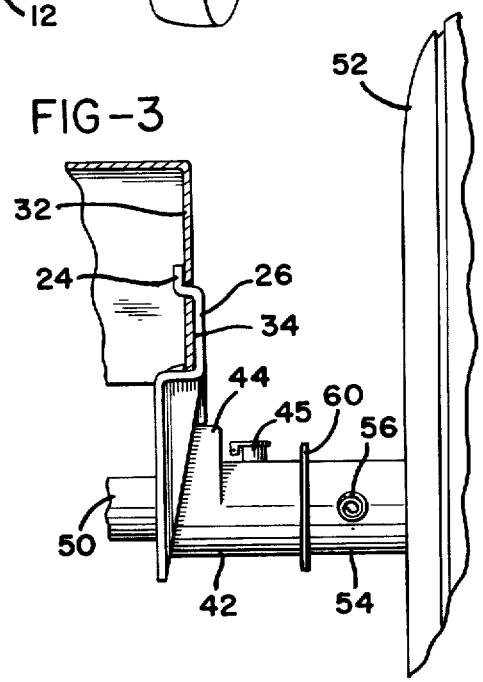
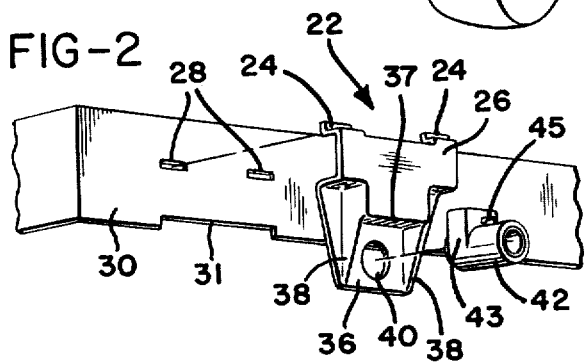
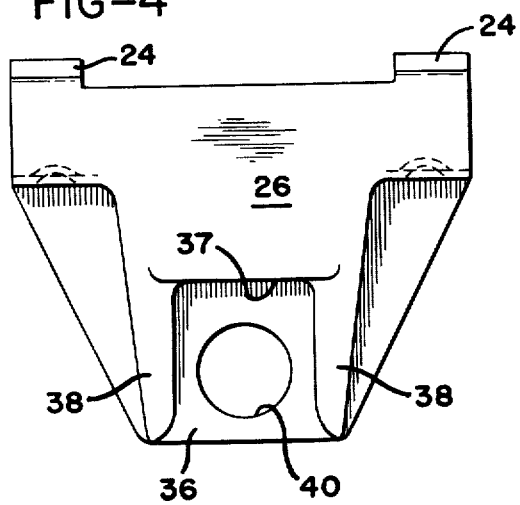
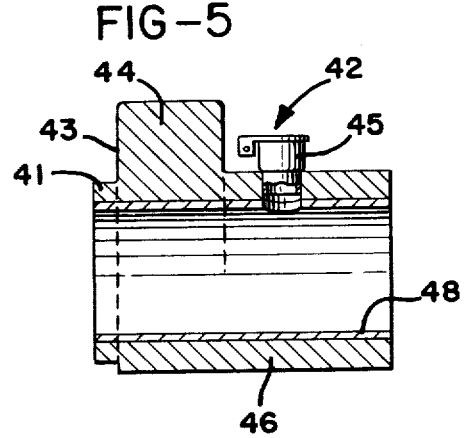

WHEELED VEHICLE WITH SNAP-IN WHEEL SUPPORTS

BACKGROUND OF THE INVENTION

In conventional mowers the wheel assemblies are generally bolted to the chassis. For example, in riding mowers, where the front wheel or wheels are steerable, the rear wheels will generally be bolted to the chassis.

This construction is subject to loosening, misalignment and rattles through normal use. Additionally, even the replacement of a simple wear part, such as an axle bearing, is time consuming and requires an assortment of tools. This is also reflected in relatively high initial assembly costs.

SUMMARY OF THE INVENTION

The present invention provides a wheel support for a mower or other similar wheeled vehicles in which the supports may be snapped into position and held in position by the attachment of the wheels to the axle of the vehicle.

Specifically, the chassis is provided with slots in opposite sides thereof, which slots receive tongues on the wheel supports. The wheel supports also include body portions which receive the axle and, preferably, bearings to rotatably support the axle in the wheel supports.

In a preferred form of the invention, the tongues on the wheel supports are offset with respect to the body portions thereof and are inserted through the slots formed in a depending skirt portion of the chassis and engage an inner surface of the skirt.

The body portions of the wheel supports overlie an outer surface of the skirt and are fixed against movement away from engagement with the outer surface by virtue of the fact that the wheels are fixed to the axle extending through the body portion of each of the wheel supports.

Thus, the construction of the present invention provides a simplified "snap-in" construction in which the axle and wheels hold the assembly together, eliminating the need for additional hardware and providing a loaded structure, relatively easy to both assemble and repair.

BRIEF DESCRIPTION OF THE DRAWINGS

FIG. 1 is a perspective view of a mower incorporating the present invention;

FIG. 2 is an exploded perspective view of a right rear portion of the mower of FIG. 1 showing the wheel support assembly of the present invention;

FIG. 3 is a view, partly in section, of a portion of the assembly of FIG. 2;

FIG. 4 is an elevational view of a wheel support; and

FIG. 5 is a cross sectional view through an axle bearing.

DESCRIPTION OF THE PREFERRED EMBODIMENT

As seen in FIG. 1 of the drawings, a mower 10 incorporating the wheel support of the present invention may be of the riding type which is self-propelled and includes a chassis 12, a motor 14 for both powering the mower and driving a cutting blade (not shown), steerable front wheels 16, a seat 18 and a steering control 20. While the mower illustrated herein is of the riding type, it will be apparent as the description proceeds that the present invention may also find use in nonriding mowers of either the push or self-propelled type.

Regardless of the specific type of mower involved, it will be seen with reference to FIGS. 2-5 that a wheel assembly in accordance with the present invention includes a pair of wheel supports 22 for each set of nonsteerable wheels. The wheel supports include upwardly extending tongue portions 24 which are offset with respect to a body portion 26. The tongues 24 are inserted through slots 28 formed in a depending skirt portion 30 of the chassis 12 and the supports are then pivoted downwardly, snapping them into place in the notches 31 with the tongues 24 thereof engaging an inner surface 32 of the skirt portion while the body portion engages an outer surface of the skirt as indicated at 34.

The lower portion 36 of the wheel support is offset inwardly to define an overhanging shoulder 37 and is provided with a pair of strengthening ribs 38. An opening 40 is defined through the body portion between the ribs 38 and receives a reduced portion 41 of a bearing 42. The bearing 42 is also provided with an enlarged section 43 having a flat upper surface 44 which engages shoulder 37 and prevents rotational movement of the bearing in the opening 40. Bearing 42 may also be provided with a lubrication fitting, as indicated at 45.

Bearing 42 also includes a shank portion 46 which extends outwardly and receives a low friction sleeve 48, which in turn rotatably receives an end of an axle 50. In steerable type mowers, the axle will generally be of compound construction incorporating a differential to accommodate turning of the vehicle. In simpler constructions, the axle may simply be a single, through shaft extending through bearing 42 in each of the wheel supports positioned on opposite sides of the vehicle chassis.

In either case, each end of the axle is received in a wheel 52, which preferably will include an inwardly projecting hub 54. The hubs 54 are attached to each end of the axle by drift pins 56 or other suitable fasteners, such as nuts and bolts, set screws or the like, and fix the wheels on the axle with the inner end 58 of each hub bearing against a washer 60 interposed between the ends of the bearing 42 and hub 54.

With this construction it will be seen that the attachment of the wheels to the axle fixes the wheel supports to the chassis and the bearings in the wheel supports. With the wheels so attached, the wheel supports are prevented from pivoting outwardly about the tongues thereof, resulting in a simplified but sturdy construction which eliminates the necessity of providing separate fasteners for attaching the wheel support assembly to the vehicle chassis and facilitates construction and repair thereof.

Additionally, by attaching wheels 52 to axle 50 with the wheel hubs pressing inwardly against bearings 42, a loaded construction is provided which tends to prevent rattles from developing during normal use.

While the form of apparatus herein described constitutes a preferred embodiment of the invention, it is to be understood that the invention is not limited to this precise form of apparatus, and that changes may be made therein without departing from the scope of the invention.

What is claimed is:

1. A wheeled vehicle comprising:

a. a chassis, b. means defining slots in said chassis on opposite sides thereof,
c. a pair of wheel supports,
d. each of said wheel supports including a tongue portion and a body portion extending from said tongue portion and having inner and outer faces,
e. said tongue portions of said wheel supports being received in said slots formed in said chassis on opposite sides thereof,
f. said body portions of said wheel supports having said inner faces thereof overlying and engaging underlying portions of said chassis,
g. an axle extending across said chassis and through openings formed through said body portions of said wheel supports,
h. a pair of wheels positioned outwardly of said outer faces of said wheel supports and receiving opposite ends of said axle at opposite sides of said chassis, and
i. means fixing said wheels to said axle outwardly of said wheel supports and preventing outward pivoting movement of said wheel supports about said tongue portions thereof away from engagement of said body portions with said chassis and disengagement of said tongue portions from said slots.

2. The vehicle of claim 1 further comprising:
a. bearing means received in said wheel supports and rotatably mounting said axle therein.

3. The vehicle of claim 1 wherein:
a. said slots in said chassis are formed in a depending skirt portion thereof.

4. The vehicle of claim 3 wherein:
a. said tongue portions of said wheel supports extend through said slots and engage one surface of said skirt portion, and
b. said body portions engage an opposite surface of said skirt portion.

5. The vehicle of claim 4 wherein:
a. said tongue portions engage an inner surface of said depending skirt portion.

6. The vehicle of claim 5 wherein:
a. said body portions of said wheel supports extend downwardly along an outer surface of said depending skirt portion, and
b. said openings in said body portions are formed therein beneath a lower edge of said skirt portion.

7. The vehicle of claim 1 further comprising:
a. bearings received in said openings in said body portions of said wheel supports and rotatably mounting said axle therein.

8. The vehicle of claim 1 wherein said fixing said wheels to said axle comprises:
a. a hub portion extending from each of said wheels, and
b. means extending through said hub portion into engagement with said axle.

9. The vehicle of claim 1 further comprising:
a. bearing means received in said wheel supports and rotatably mounting said axle therein, and
b. means on said bearing means and said wheel supports preventing rotational movement of said bearing means with respect to said bearing supports.

* * * * *